United States Patent Office 3,338,213
Patented Aug. 29, 1967

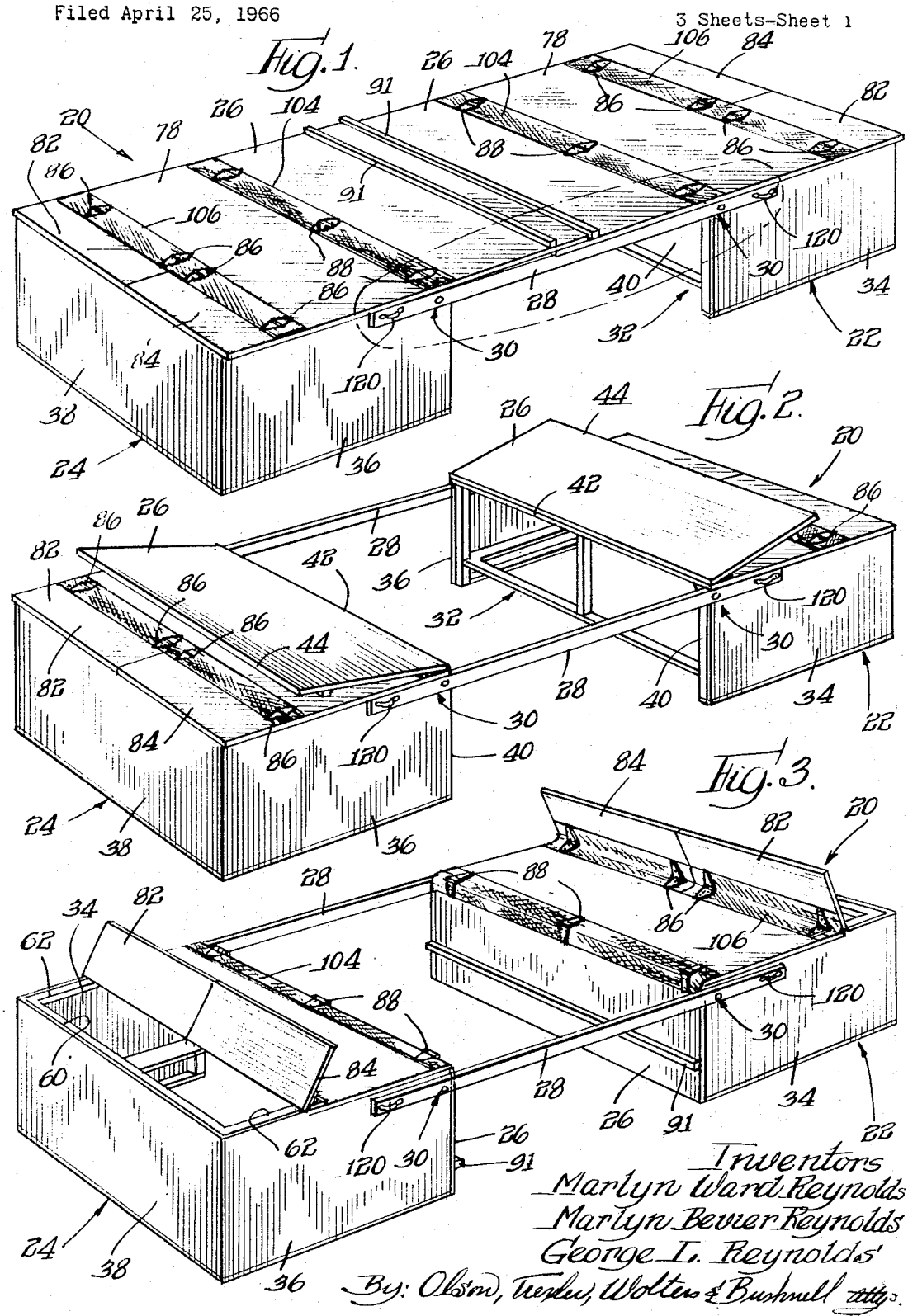

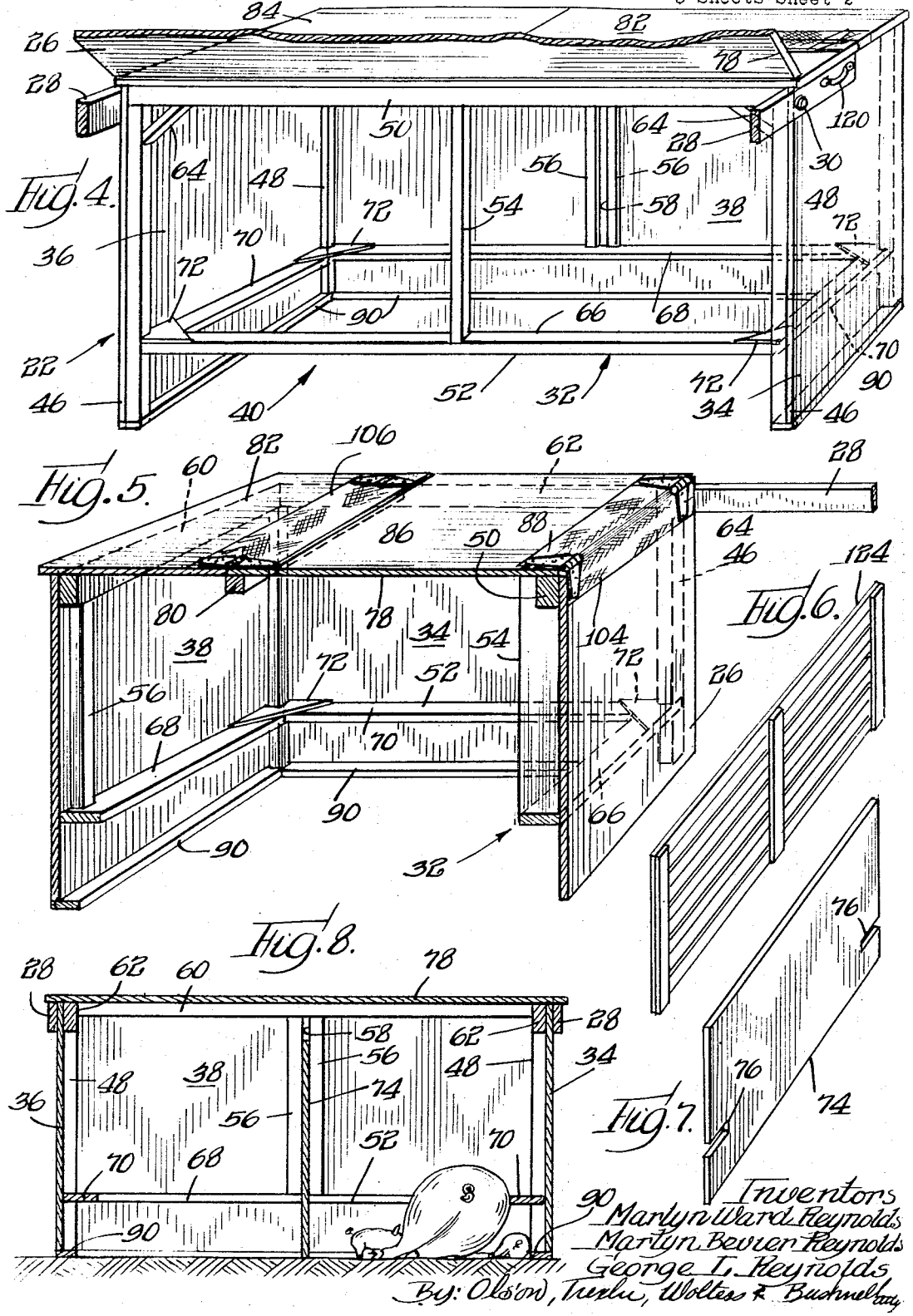

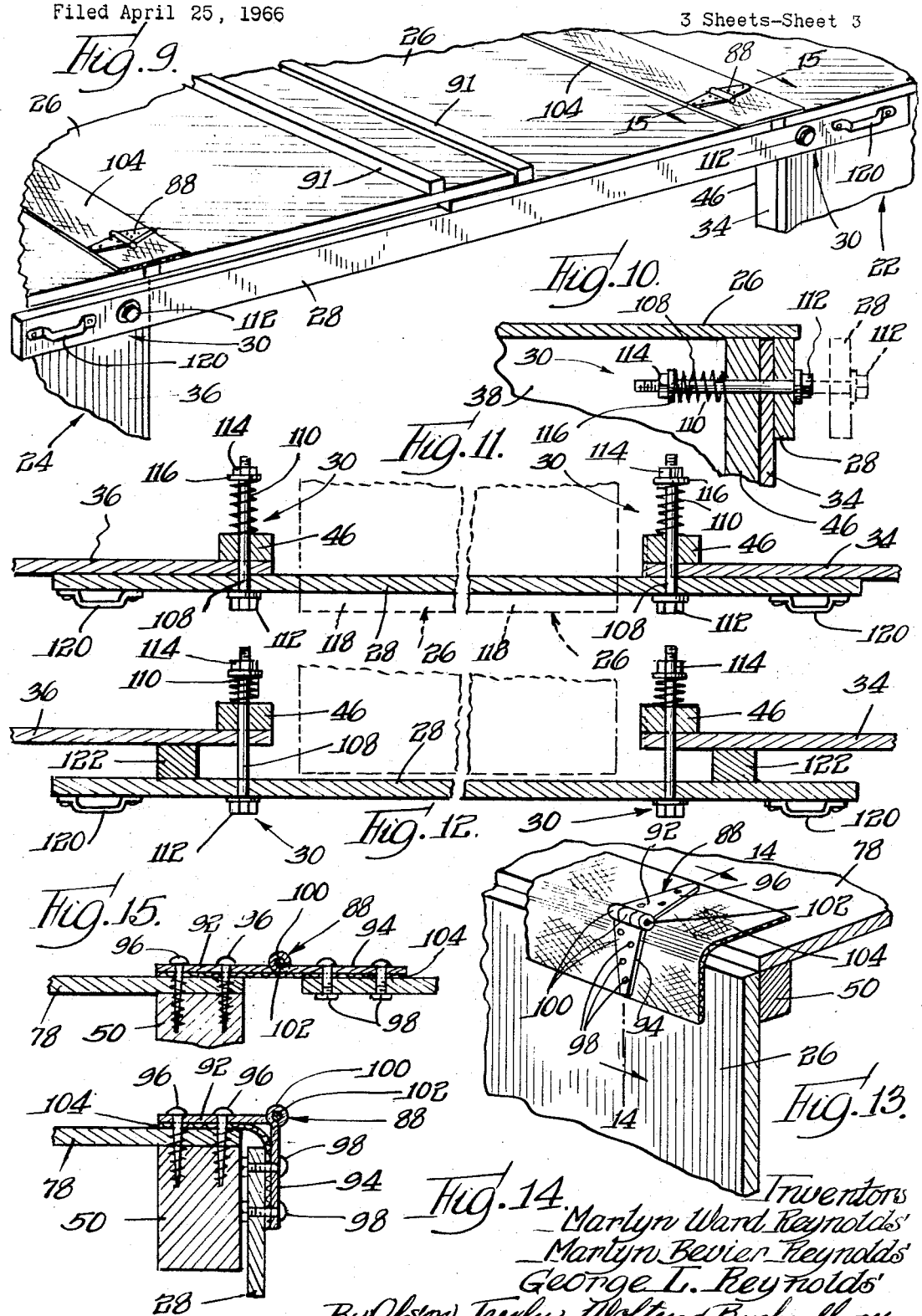

3,338,213
FARROWING SHELTER
Marlyn Ward Reynolds, Marlyn Bevier Reynolds, and George L. Reynolds, all of Greystone Acres, Altona, Ill. 61414
Filed Apr. 25, 1966, Ser. No. 545,036
9 Claims. (Cl. 119—16)

ABSTRACT OF THE DISCLOSURE

This invention relates to an animal shelter including a pair of housing units having otherwise closed peripheries with front openings. The housing units are spaced apart and arranged with the front openings confronting each other. An imperforate canopy panel is swingably mounted on each housing unit for selectively closing the front opening thereof and providing a shelter. In order to join the two units together, a pair of coupling bars are situated along opposite sides of the housing units, and special means are employed for securing the coupling bars to the housing units.

---

This invention relates generally to animal housing devices and more particularly to structures for housing swine.

In the raising of swine, it is desirable to provide shade for the animals in order to reduce their exposure to summer sun and heat and to provide more complete shelter during cold weather, particularly in more northern regions and especially for sows during farrowing time. In the past, hog houses have been simply constructed affairs with sloping sides which give the building the general outline of the letter "A" when viewed from one end. Auxiliary shade has been provided, if at all, by means of slatted canopies; and both ventilation and access to the interior of such houses have been achieved by hinging the upper part of one of the sloping sides. While presenting comparatively low resistance to wind, being thereby more storm-secure, slatted canopies offer poor shelter from late fall and early spring rains; and the task of working with the young pigs at various stages of their development has proved to be awkward when they are housed in the A-shaped structures.

Therefore, an important object of the present invention is to provide a housing device for swine which affords a structurally stable shelter area of generous size and which presents a convenient arrangement for working with the housed stock.

A more general object of the invention is to provide a new and improved animal shelter device.

Another object of the invention is to provide an animal shelter device that is easily and quickly converted from a tight enclosure to a ported arrangement with a canopied yard.

Still another object of the invention is to provide an animal shelter device having a substantially weather-tight roof and canopy.

Yet another object of the invention is to provide an animal shelter device of strong, lightweight construction.

These and other objects and features of the invention will become more apparent from a consideration of the following descriptions.

In order that the principles of the invention may be readily understood, a single embodiment thereof, but to which the application is not to be restricted, is shown in the accompanying drawings wherein:

FIG. 1 is a perspective view of an animal shelter device constructed in compliance with the principles of the invention, the canopy panels being disposed in horizontal position to form a canopy;

FIG. 2 is a perspective view similar to the showing of FIG. 1 but illustrating the canopy panels folded back to permit working between the housing units;

FIG. 3 is another perspective view similar to the showing of FIG. 1 but illustrating the canopy panels folded down to close the fronts of the housing units, additionally showing the top access doors folded back to expose the interior of the housing units;

FIG. 4 is an enlarged perspective view of one of the housing units employed in the shelter device of FIG. 1, a view taken generally toward the front opening thereof to reveal details of the internal construction;

FIG. 5 is an enlarged perspective view taken in central cross-section through one of the housing units to show structural details and, in particular, the arrangement of the hinges for the front panel and the top access doors;

FIG. 6 is an intermediate scale, perspective view of a slatted gate that may be used either between the housing units in forming a yard enclosure or across the front of one unit in forming a creep feeder;

FIG. 7 is a notched panel for use inside of one of the housing units;

FIG. 8 is an intermediate scale, elevational view showing the notched panel of FIG. 7 used to separate one of the housing units into separate stalls;

FIG. 9 is an enlarged perspective view of that portion of the shelter device of FIG. 1 which is enclosed by a dashed elliptical line;

FIG. 10 is an enlarged view taken along the line 10—10 of FIG. 9, showing the construction of the mounting means for the coupling bars;

FIG. 11 is a top plan view in cross-section, showing the coupling bar in position for supporting the canopy panels;

FIG. 12 is a view similar to the showing of FIG. 11 but illustrating the coupling bars spaced from the walls of the housing units to permit a free swinging action of the canopy panels;

FIG. 13 is an enlarged, fragmentary, perspective view of the swingable mounting for one of the canopy panels;

FIG. 14 is a further enlarged view taken substantially along the line 14—14 of FIG. 13; and FIG. 15 is a view similar to the showing of FIG. 14 but illustrating the canopy panel in a raised position, being taken along the line 15—15 of FIG. 9.

Referring now in detail to the drawings and specifically to FIGS. 1 and 2, an animal shelter device constructed in accordance with the invention is indicated generally by the reference numeral 20. The shelter device 20 includes a pair of substantially identical housing units 22 and 24, an imperforate canopy panel 26 swingably mounted to each of the housing units, a pair of parallel, coupling bars 28, and mounting unit 30 for securing the coupling bars 28 respectively to each of the housing units.

Each of the housing units 22 and 24 comprises a structural frame 32 to which wall elements are suitably attached, as by means of adhesive and wood screws, forming a rectangular parallelepiped. Specifically, sidewalls 34 and 36 and a backwall 38 are affixed to the frame 32 so that each housing unit poseses an otherwise closed periphery that is perforated with a front opening 40. The front opening 40 extends substantially from the forward edge of sidewall 34 to the corresponding edge of sidewall 36; and advantageously, the associated canopy panel 26 is fashioned to take a corresponding width whereby to form an effective closure for the front opening 40. In compliance with the features of the present invention, the housing units 22 and 24 are disposed in spaced apart relationship with the front openings 40 thereof confronting each other; and in more particular accord with the features of the invention, the housing units 22 and 24 are spaced apart by a distance less than twice the height of a canopy panel 26. Thus, the respective canopy panels 26, each having a hinged edge 42 and a free edge 44, may be arranged with the free edges overlapping when the canopy panels are horizontally disposed, as is well shown in FIG. 1. This overlap promotes a weather-proof joint between the canopy panels, and the fact that the overlying free end is elevated slightly by the thickness of the underlying canopy panel encourages the runoff of atmospheric moisture in the form of rain, melted snow or condensed vapors. The comparatively dry footing which is accorded between the housing units by means of the overlapping canopy panels combines with the shelter provided by the imperforate character of the panels to develop a healthful, comfortable enviroment for the stock housed in the units 22 and 24.

Turning to FIGS. 4 and 5 for a more detailed description of the frame 32, that structural arrangement comprises a pair of front corner posts 46, a pair of rear corner posts 48, a header 50 that spans the front corner posts 46 over the front opening 40 and a horizontal subframe 52 which traces the perimeter of the housing unit spaced a predetermined distance above the ground or floor. In addition, the structural frame 32 includes a medial front post 54 and a pair of medial rear posts 56 which are spaced horizontally to define a vertical slot 58 therebetween. A horizontal rear beam 60 extends between posts 48 at the tops thereof, and horizontal lateral beams 62 extend between each of the rear posts 48 and the corresponding front post 46. Furthermore, diagonal braces 64 are disposed at the front corners between header 50 and the posts 46.

In compliance with the present invention, the subframe 52 takes the shape of a hollow rectangle, being fashioned from a front rail 66, a back rail 68 and side rails 70. These various rails are rigidly joined together, as by means of gussets 72 affixed to the rails 66, 68 and 70 at the junctures thereof. In compliance with a feature of the invention, the subframe 52 is attached to the sidewalls 34 and 36 and to the rearwall 38 at a position about one foot of the bottom edges thereof. Furthermore, the rails 66, 68 and 70 of the subframe 52 are arranged to have a horizontal extent of at least about six inches. So arranged, the subframe 52 establishes a pig guard rail in accordance with the suggestion of FIG. 8. As is shown in the latter figure, the vertical positioning and the horizontal extent of the rails of subframe 52 prevents a sow from stepping on or rolling on her offspring when the young pigs seek refuge beneath the subframe elements.

When the housing units of the invention are specifically employed as farrowing shelters, it is desirable during the period that the sow is confined to provide a separate stall for each sow. Being generously dimensioned, each housing unit may be conveniently divided into two stalls for this purpose. In such case, the slot 58 between the medial posts 56 at the rear of the housing unit is employed in mounting an interior partition panel 74 as is shown in FIG. 8. Turning to FIG. 7, the partition 74 is provided with a pair of deep horizontal notches 76 which receive the front rail 66 and the back rail 68 respectively in the mounted position of the partition.

Making the partition 74 easily removable permits extraction of the partition from the housing unit so as to keep two sows from crowding into a single stall after they have farrowed and been allowed a certain amount of freedom. Such crowding might be motivated by the animals seeking each other's warmth in cold weather and, of course, presents the hazard of crushing any young pigs that might be in the over-populated stall. Insertion of the partition 74 is accomplished by placing that element diagonally in the housing unit with the notches 76 receiving the confronting edges of rails 66 and 68. The rear edge of the partition will then be situated in the slot 58 and subsequently brought into contact with the front medial post 54. Removal of the partition is readily accomplished by reversing this procedure.

Returning to FIGS. 4 and 5, the housing unit 22, in addition to the structural and enclosure elements thus far described, includes a stationary roof panel 78 which is shown to be substantially flat, although it may take a slight pitch if desired. The roof panel 78 is affixed to the header 50 and to a joist member 80 which is mounted to the side plate elements 62 parallel to the header 50. In order to provide access to the interior of the housing unit when the canopy panel 26 is swung down to close the front opening 40, a pair of top doors 82 and 84 are swingably mounted to the joist member 80 by means of hinges 86. When swung down to be coplanar with the stationary roof panel 78, the access doors 82 and 84 roof over the housing unit rearwardly of the stationary roof panel. Two such access doors are provided to allow individual access to the stalls into which the housing unit is divided by means of the partition 74. Like the joist member 80, the header 50 serves as a hinge mounting element, particularly for a number of hinges 88 by which the canopy panel 26 is swingably mounted to the housing unit.

Base border strips 90 are advantageously secured to the bottom edges of the rearwall 38 and the sidewalls 34 and 36 and beneath the bottom ends of the several corner posts of the housing unit to act as a moisture barrier when the housing units is situated on bare ground rather than a paved yard. A perforated floor may be installed in the housing unit, if desired.

Advantageously, the various enclosure elements, including the canopy panel 26, the sidewalls 34 and 36, the rearwall 38 and the access doors 82 and 84 are fabricated from a suitable sheet material. Marine or exterior grade plywood, with or without a surface coating, has proved eminently useful in this regard. Similarly, the various structural elements are conveniently fabricated from lumber of construction or other suitable grade. Using such materials in the described structure results in lightweight units that are easily moved around. Such fabrication is also comparatively inexpensive; and it is recognized that the animal shelter device of the invention may be provided in a kit of prefabricated parts for assembly by the ultimate user. Adhesive and suitable metal fasteners, such as wood screws or nails, are conveniently employed in making the necessary joinings.

Using sheet material for the enclosure elements is facilitated by the various rigidifying elements of the structural frame 32. Primary stiffening of the housing unit is provided by the subframe 52, and supplementary stiffening is provided by the medial posts 56, and the header 50 and the joist element 80. In addition, a horizontal stiffening bar 91 is advantageously secured to each of the canopy panels 26 as is shown in FIG. 1, these stiffening bars being spaced away from the free edge 44 of the each canopy panel by a distance slightly greater than the amount of overlap that the canopy panels achieve in their horizontal position. Thus, the bars 91 afford their stiffening function without interfering with the overlapped relationship. The position of the stiffening bars 91 is also shown in FIG. 9.

Turning to a consideration of FIGS. 13–15 for a more detailed description of the swingable mounting of the canopy panels 26, each of the hinges 88 is seen to comprise a pair of leaves 92 and 94 which are fastened respectively to the stationary roof 78 and the canopy panel 26 by wood screws 96 and bolts 98. The screws 96 are selected to be of sufficient length to enter the header 50 for anchoring. Correspondingly, the bolts 98 pass through the canopy panel 26 to receive nuts on their threaded ends. It is recognized that rivets may be used in place of the bolts 98. The leaves 92 and 94 have interfitting knuckles 100 which receive a hinge pintle 102 that defines the pivot or hinge axis. The ends of the pintle 102 may be riveted over or otherwise secured in place in accordance with principles well known in the hardware art. In specific accord with the principles of the present invention, the hinges 88 are constructed to have an arc of movement of at least about 270° in order that the canopy panel 26 may swing between the closed position of FIG. 3 and the work position of FIG. 2. In further accord with the invention, a strip 104 of flexible sheet material is secured over the juncture between the canopy panel 26 and the remainder of the housing unit to form a weather seal, waterproofed canvas having proved eminently useful in this regard. An inspection of FIGS. 13–15 indicates that the strip 104 may be held in place by being situated beneath the hinges 88. In addition, a layer of suitable adhesive may be disposed beneath the strip 104 for securing the strip respectively to the stationary roof 78 and the canopy panel 26. As will be seen in FIG. 5, for example, a similar strip 106 of flexible sheet material is desirably secured over the juncture between stationary roof panel 78 and the access doors 82 and 84 and beneath the hinges 86.

With reference now to FIGS. 9–12, each mounting unit 30 that is used in attaching the coupling bars 28 includes a horizontal bar or post defined by the shank of a machine screw 108 and a cooperating biasing arrangement defined by a compression spring 110. The machine screw 108 passes slidably through aligned apertures in the coupling bar 28, a sidewall panel of the housing unit and a corner post 46, the machine screw 108 being provided with a head 112 at one end while threadedly receiving a nut 114 at the opposite end. Advantageously, the compression spring 110 is situated inside the housing unit between the corner post 46 and a spring-retaining washer 116 that is disposed beneath the nut 114. Thus, suitable biasing force may be drawn into the compression spring 110 by turning the nut 114 an appropriate distance onto the machine screw 108, whereby to situate the coupling bar 28 normally in contact with the sidewall of the housing unit. In this normal position of the coupling bar 28, it provides a support for the canopy panels 26 when the latter are disposed generally horizontally; and so that the coupling bars may thus form a downstop, the canopy panels are provided with laterally extending sections 118 which extend laterally at least sufficiently to abut the tops of the coupling bars in accordance with the dotted line showing of FIG. 11.

In order to reposition the canopy panels 26 into vertical location, each of the coupling bars 28 is provided with a handle 120 adjacent each of the mounting units 30. The handles 120 facilitate pulling the coupling bars away from the sidewalls of the housing unit by a distance sufficient to permit the canopy panels to drop into vertical position. In accord with the invention, the coupling bars 28 extend along the sidewalls 34 and 36 of the housing units and away from the hinged edge of the canopy panel so that a spacer block 122 may be situated between the coupling bar and the sidewall of the housing unit, as is shown in FIG. 12. The blocks 122 temporarily position the coupling bar in a location where it cannot act as a downstop. When arranged as described, the canopy panels 26 may be repositioned by a single person. It should be recognized that the mounting units 30 cooperate with the coupling bars 28 in joining the housing units together.

From the foregoing descriptions, it will be apparent that the shelter device 20 can readily take a plurality of useful conditions: an animal confining condition shown in FIG. 3 where the canopy panels 26 close off the front opening 40 and where top doors 82 and 84 provide access to the confined animals; a shelter condition shown in FIG. 1 where the canopy panels 26 are disposed horizontally to form a covered yard between the open housing units; and a work condition shown in FIG. 2 where the canopy panels are folded back to permit a man to perform various tasks with animals confined in the housing units. In the latter condition, slatted gates, such as slatted gate 124 shown in FIG. 6, are situated beneath the coupling bars 28 to fence off the area between the housing units, an additional slatted gate being usefully disposed in front of one of the housing units to segregate animals worked on from those yet to be worked on. A slatted gate of the general character of gate 124 may also be attached across the front opening 40 above the subframe 52 of structural frame 32 so as to convert one of the housing units into a creep feeder for young pigs. Conversion of the housing units among these several conditions is readily accomplished by manipulating the canopy panels 26 and coupling bars 28 in the manner described hereinabove.

The specific example herein shown and described is to be considered as being primarily illustrative. Various changes in structure will, no doubt, occur to those skilled in the art and such changes are to be understood as forming a part of this invention insofar as they fall within the spirit and scope of the appended claims.

The invention is claimed as follows:

1. An animal shelter device comprising: first and second front opening housing units, said housing units being disposed in a spaced apart relationship with the front openings thereof confronting each other; a first canopy panel pivotally connected to said first housing unit; a second canopy panel connected to said second housing unit, said first and second canopy panels being movable from a position sheltering an area intermediate said first and second housing units to a position blocking substantially the entire front openings of said housing units; a pair of parallel coupling bars disposed along opposite sides of said first and second housing unit; and mounting means for securing said bars to said first and second housing units to join said housing units together, said bars being movable outwardly relative to each other and the sides of said housing units from a first position to a second position, said bars in said first position being connected to said first and second housing units and located inwardly of outer edge portions of said first and second canopy panels to support said canopy panels in the position sheltering the area intermediate said first and second housing units, said bars in said second position being connected to said first and second housing units and located outwardly of the outer edge portions of said first and second canopy panels to enable said canopy panels to pivot from the position sheltering the area intermediate said first and second housing units to the position blocking substantially the entire front openings of said housing units.

2. An animal shelter device according to claim 1 wherein said housing units are spaced apart by a distance less than twice the height of a said panel whereby said panels overlap in the sheltering position thereof for forming a weatherproof joint.

3. An animal shelter device according to claim 1 wherein said panels are swingably mounted to said housing units by hinges having an arc of movement whereby to swing said panels from the position blocking said front openings, through the position sheltering the area intermediate said housing units and to a position overlying said housing units for establishing a spaceous work place between said units.

4. An animal shelter device according to claim 3 which further comprises flexible sheet material secured over the juncture between each of said panels and the cooperating housing unit to provide a weatherseal.

5. An animal shelter device according to claim 1 wherein each of said housing units includes sidewall panels of structural sheet material and a rectangular brace rail disposed horizontally around the inside of said unit, said rail being situated with respect to said sidewall panels about one foot above the bottom edges thereof and having a horizontal extent of at least about six inches whereby to define a pig guard rail.

6. An animal shelter as set forth in claim 1 wherein: said mounting means includes a plurality of spring elements for urging said bars into the first position and spacer means selectively engageable with said bars to hold said bars in said second position against the urging of said spring elements.

7. An animal shelter device according to claim 6 wherein said mounting means further includes post means and cooperating biasing means for urging said bars toward said housing units.

8. An animal shelter device as set forth in claim 1 wherein: said first and second canopy panels are also pivotable to a third position overlying roof sections of said first and second housing units respectively to provide access to the area intermediate said first and second housing units while the front openings of said first and second housing units are unobstructed by said first and second canopy panels.

9. An animal shelter device as set forth in claim 1 wherein: said first and second housing units each includes a roof having a fixedly mounted section and a pivotal door section for providing access to an interior area of an associated housing unit, said door section being connected to the associated housing unit by flexible sheet material secured over a juncture between the door section of the roof and the fixedly mounted section of the roof to provide a weather seal.

References Cited

UNITED STATES PATENTS

| | | | |
|---|---|---|---|
| 1,307,862 | 6/1919 | James | 119—16 |
| 1,533,834 | 4/1925 | Cullinane | 119—19 |
| 1,823,940 | 9/1931 | Hoegermeyer | 119—16 |
| 1,875,433 | 9/1932 | Fitzpatrick | 119—16 |
| 2,293,569 | 8/1942 | Sonino | 52—71 |
| 2,721,060 | 10/1955 | Morain | 256—64 |

SAMUEL KOREN, *Primary Examiner.*

HUGH R. CHAMBLEE, *Examiner.*